United States Patent [19]

Harms et al.

[11] 4,146,363
[45] Mar. 27, 1979

[54] DYEING SYNTHETIC POLYAMIDES

[75] Inventors: Wolfgang Harms; Hans-Günter Otten, both of Leverkusen, Fed. Rep. of Germany

[73] Assignee: Bayer Aktiengesellschaft, Leverkusen, Fed. Rep. of Germany

[21] Appl. No.: 884,575

[22] Filed: Mar. 8, 1978

[30] Foreign Application Priority Data

Mar. 9, 1977 [DE] Fed. Rep. of Germany ....... 2710152

[51] Int. Cl.² .................... C09B 1/00; C07C 143/665
[52] U.S. Cl. ........................................ 8/39 B; 8/25; 260/374
[58] Field of Search .................... 8/39 B, 25

[56] References Cited
FOREIGN PATENT DOCUMENTS 538310 10/1931 Fed. Rep. of Germany.
1335328 7/1963 France.

OTHER PUBLICATIONS

Venkataraman, K., "The Chemistry of Synthetic Dyes", vol. V (Academic Press, 1971), pp. 63-75.

Primary Examiner—A. Lionel Clingman
Attorney, Agent, or Firm—Plumley and Tyner

[57] ABSTRACT

The dyestuff of the formula

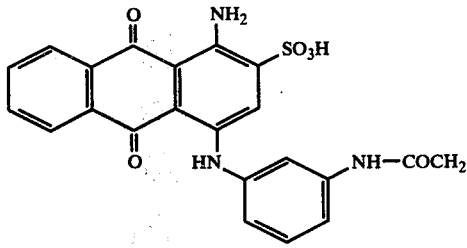

is suitable for dyeing synthetic polyamide textile materials, in particular for combination dyeings because of its favorable uptake properties.

3 Claims, No Drawings

DYEING SYNTHETIC POLYAMIDES

The invention relates to the use of the water-soluble anthraquinone dyestuff which corresponds, in the form of the free acid, to the formula

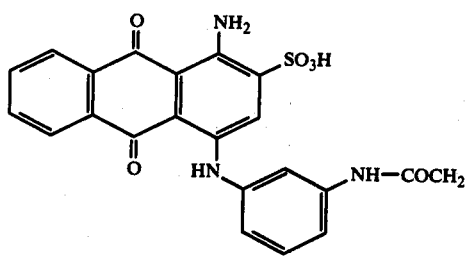

for dyeing synthetic polyamide textile materials, in particular those consisting of polyamide 6 and polyamide 66. This dyestuff is in itself known, from German Patent Specification No. 538,310, for dyeing wool. With regard to their uptake properties and affinity properties, not all wool dyestuffs are also equally suitable for dyeing synthetic polyamides. This is true, in particular, for their properties in combination dyeings.

For example, the above dyestuff has a higher affinity for synthetic polyamide materials than C.I. Acid Blue 76. In combination dyeings with other dyestuffs which have an affinity for fibres, it exhibits no sign of displacement and, because of its favourable uptake properties, is outstandingly suitable for combination dyeings. Because of its high affinity for fibres, the dyestuff has excellent fastnesses to wet processing, with good solubility at the same time, and a remarkably low sensitivity towards salts causing water hardness. In addition, the dyestuff exhibits a good fastness to ozone.

EXAMPLE 1

0.1 g of the Na salt of 1-amino-4-(3-acetylaminophenyl)-amino-anthraquinone-2-sulphonic acid is dissolved hot in 100 ml of water. 5 ml of 10% strength ammonium acetate solution are added, and the mixture is diluted with water to a volume of 500 ml. 10 g of a textile fabric consisting of polyamide 6 is put into this dyebath and the dyebath is heated to the boil in the course of 20 minutes.

After boiling for half an hour, 4 ml of 10% strength acetic acid are added and the mixture is kept at the boiling point for a further half an hour. Thereafter, the fabric is taken out of the dyebath, rinsed and dried at 70°-80°.

A uniform blue dyeing is obtained which is distinguished by good fastnesses to light and wet processing.

The above dyestuff can be prepared, for example, in the following manner:

21.7 g of 3-amino-acetylaminobenzene hydrochloride are suspended in 450 ml of water and are dissolved by adjusting the pH value to 7-8. 40 g of 1-amino-4-bromo-anthraquinone-2-sulphonic acid in the form of its Na salt and 40 g of sodium bicarbonate are added to the solution and the mixture is heated to 65°. A solution of 1.0 g of copper-I chloride in 7.5 ml of saturated sodium chloride solution is added dropwise to the solution and the temperature is further kept at 65°. The reaction has ended after about 6 hours. 38 ml of concentrated hydrochloric acid are added dropwise at 60°, the solid is filtered off and the cake is washed with 800 ml of 1% strength warm hydrochloric acid. The moist cake is suspended in 950 ml of water, 19 ml of concentrated aqueous ammonia and 15 g of ammonium sulphate are added to the suspension and, by heating the mixture to 90°, a solution is prepared, from which the dyestuff is precipitated by adding 20 g of sodium sulphate. The dyestuff is filtered off and washed with 350 ml of 1% strength sodium chloride solution.

EXAMPLE 2

0.05 g of the above dyestuff and 0.05 g of C.I. Acid Red 337 are dissolved hot in 200 ml of water. After adding 10 ml of 10% strength ammonium acetate solution, the mixture is diluted with water to 1,000 ml. 20 g of textile fabric consisting of polyamide 6 are put into the dyebath and the dyebath is heated to the boil in the course of 20 minutes. After a further half an hour, 8 ml of 10% strength acetic acid are added and the mixture is kept at the boiling point for a further half an hour. The dyed material is removed from the bath and dried at 70°-80°. A very uniform violet dyeing is obtained with good fastness to light and wet processing.

EXAMPLE 3

0.05 g of the above blue anthraquinone dyestuff, 0.05 g of C.I. Acid Red 337 and 0.1 g of C.I. Acid Yellow 197 are dissolved hot in 200 ml of water. After adding 10 ml of 10% strength ammonium acetate solution, the mixture is diluted with water to a volume of 1,000 ml. 20 g of textile fabric consisting of polyamide 6 are put into this dyebath and the dyebath is heated to the boil in the course of 20 minutes. After boiling for half an hour, 8 ml of 10% strength acetic acid are added and the mixture is kept at the boiling point for a further half an hour. Thereafter, the fabric is removed from the dyebath, rinsed and dried at 70°-80°. A very uniform brown dyeing is obtained which has good fastnesses to light and wet processing.

The temperature degrees indicated are degrees Centigrade. The C.I. dyestuffs mentioned in the description contain the following colour solids: C.I. Acid Blue 76: 1-amino-4-(3-hydroxyacetylaminoanilino)-anthraquinone-2-sulphonic acid; C.I. Acid Red 337: 1-(2-trifluoromethylphenylazo)-2-amino-8-hydroxy-naphthalene-6-sulphonic acid; and C.I. Acid Yellow 197: 4-ethoxy-4'-phenylazo-azobenzene-2-sulphonic acid.

We claim:

1. A process for dyeing synthetic polyamide textile material by using a combination of a dyestuff of the formula

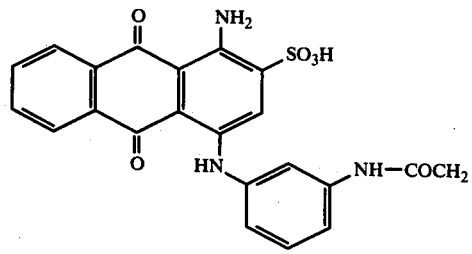

and one or more other dyestuffs having an affinity for polyamide textile material.

2. The process of claim 1 wherein the polyamide is polyamide 6.

3. The process of claim 1 wherein the polyamide is polyamide 66.